(12) United States Patent
Byrne et al.

(10) Patent No.: US 8,271,122 B2
(45) Date of Patent: **\*Sep. 18, 2012**

(54) PROCESS CONTROL USING PROCESS DATA AND YIELD DATA

(75) Inventors: Tamara Byrne, San Jose, CA (US); Lennart Eriksson, Umea (SE); Svante Bjarne Wold, Hollis, NH (US)

(73) Assignee: MKS Instruments, Inc., Andover, MA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/189,280

(22) Filed: Jul. 22, 2011

(65) Prior Publication Data

US 2012/0035755 A1    Feb. 9, 2012

Related U.S. Application Data

(63) Continuation-in-part of application No. 12/603,976, filed on Oct. 22, 2009, now Pat. No. 7,996,102, which is a continuation of application No. 12/044,346, filed on Mar. 7, 2008, now Pat. No. 7,622,308.

(51) Int. Cl.
    *G06F 19/00* (2006.01)
(52) U.S. Cl. ........................................... 700/121
(58) Field of Classification Search .................. 700/121; 438/5–18
    See application file for complete search history.

(56) References Cited

U.S. PATENT DOCUMENTS

| | | | |
|---|---|---|---|
| 6,587,744 B1 | 7/2003 | Stoddard et al. | |
| 6,988,017 B2 | 1/2006 | Pasadyn et al. | |
| 7,622,308 B2 * | 11/2009 | Hendler et al. | 438/10 |
| 7,996,102 B2 * | 8/2011 | Hendler et al. | 700/121 |
| 2003/0014145 A1 | 1/2003 | Reiss et al. | |
| 2004/0029299 A1 | 2/2004 | Pasadyn et al. | |
| 2005/0060103 A1 | 3/2005 | Chamness | |
| 2005/0060336 A1 | 3/2005 | Abercrombie et al. | |
| 2005/0268197 A1 | 12/2005 | Wold | |
| 2006/0212156 A1 | 9/2006 | Tanaka et al. | |
| 2007/0238201 A1 | 10/2007 | Funk et al. | |
| 2008/0177399 A1 | 7/2008 | Fong et al. | |

FOREIGN PATENT DOCUMENTS

WO    WO 2005/054968    6/2005

OTHER PUBLICATIONS

Wold, Svante et al., "Hierarchical Multiblock PLS and PC Models for Easier Model Interpretation and as an Alternative to Variable Selection," *Journal of Chemometrics*, 10:463-482 (1996).

\* cited by examiner

*Primary Examiner* — Sean Shechtman
*Assistant Examiner* — Chad Rapp
(74) *Attorney, Agent, or Firm* — Proskauer Rose LLP

(57) ABSTRACT

A method for monitoring a manufacturing tool features acquiring metrology data ("Step a"). Data is acquired for process variables for a first process step performed by the manufacturing tool ("Step b"). A mathematical model of the first process step based on the metrology data and the acquired data is created ("Step c"). Steps b and c are repeated for at least a second process step ("Step d"). An nth mathematical model is created based on the metrology data and the data for the process variables for each of the n process steps ("Step e"). A top level mathematical model is created based on the metrology data and the models created by steps c, d and e ("Step f"). A multivariate metric is calculated based on the top level model of step f and data from subsequent runs of the manufacturing tool. Service is performed if the metric satisfies a condition.

21 Claims, 6 Drawing Sheets

PROCESS CONTROL USING PROCESS DATA AND YIELD DATA

CROSS REFERENCE TO RELATED APPLICATIONS

This application is a continuation-in-part of, claims the benefit of, and priority to U.S. application Ser. No. 12/603,976, filed Oct. 22, 2009, titled "Process Control Using Process Data and Yield Data," which is a continuation of, claims the benefit of, and priority to U.S. application Ser. No. 12/044,346, filed Mar. 7, 2008, titled "Process Control Using Process Data and Yield Data," the entire contents of which are incorporated herein by reference in their entirety.

FIELD OF THE INVENTION

The invention generally relates to methods for monitoring a manufacturing process. More particularly, the invention relates to using metrology data and process data to monitor a manufacturing process.

BACKGROUND OF THE INVENTION

Historically, semiconductor device manufacturers have managed the transition to tighter process/materials specifications by depending on process tool manufacturers to design better and faster process/hardware configurations. As device geometries shrink to the nanometer scale, however, the increasing complexity of manufacturing processes has changed the landscape that must be negotiated to meet and maintain process/materials specifications.

Stand-alone control of process tools (based on equipment state data) will not maintain viable yields at 65 and 45 nm. Advanced device processing requires tool-level control based on the combination of advanced equipment control (AEC) and sensor based process control. Furthermore, tool level control alone cannot meet all of the control needs of advanced device fabrication. System-wide implementation of advanced process control (APC) that integrates AEC with e-diagnostics, Fault Detection and Classification (FDC) and predictive mathematical models of the device manufacturing process are required.

Economic as well as technological drivers exists for the move to AEC/APC. The cost of purchasing (and developing) stand-alone process tools to meet advanced production specifications is expected to be staggering. A cost effective alternative to the purchase of a new generation of process equipment exists through the combined use of add-on sensors with AEC/APC in existing (legacy) equipment. Sensor-based AEC/APC in legacy equipment can drive these tools to the tighter specifications needed for nanometer-scale device fabrication. Additional cost benefits can be realized from reductions in scrap/rework (especially in 300 mm wafer processing) and in lower test wafer use since these can be reduced or even eliminated in systems using wafer- and/or process-state data for process control. Sensor-based AEC/APC can also reduce preventive maintenance downtimes and time to process qualifications, while increasing process capabilities, device performance, yields and fabrication throughput.

A need therefore exists for improved systems and methods for monitoring manufacturing processes. A need also exists for determining when manufacturing tools need servicing to avoid unnecessary maintenance downtime.

SUMMARY OF THE INVENTION

In one aspect, there is a method for monitoring a manufacturing tool used in a manufacturing process. The method involves acquiring metrology data for semiconductor wafers at the conclusion of a final process step for the manufacturing process ("Step a"). The method involves acquiring data for a plurality of process variables for a first process step performed by the manufacturing tool for manufacturing semiconductor wafers ("Step b"). The method involves creating a first mathematical model of the first process step performed by the manufacturing tool based on the metrology data and the acquired data for the plurality of process variables for the first process step performed by the manufacturing tool ("Step c"). The method involves repeating step b and step c for at least a second process step performed by the manufacturing tool for manufacturing the semiconductor wafers ("Step d"). The method involves creating an nth mathematical model based on the metrology data and the data for the plurality of process variables for each of the n process steps ("Step e"). The method also involves creating a top-level mathematical model based on the metrology data and the models created by steps c, d and e ("Step f"). The method involves calculating a multivariate metric based on the top-level model of step f and data for the plurality of process variables for at least one of the process steps performed by the manufacturing tool during subsequent runs of the manufacturing tool. The method involves servicing the manufacturing tool if the calculated multivariate metric satisfies a predetermined condition.

In another aspect, there is a method for monitoring a manufacturing tool. The method involves acquiring metrology data for semiconductor wafers at the conclusion of a final process step performed by the manufacturing tool ("Step a"). The method involves acquiring data for a plurality of process variables for a first process step performed by the manufacturing tool for manufacturing semiconductor wafers ("Step b"). The method involves creating a first mathematical model of the first process step based on the metrology data and the acquired data for the plurality of process variables for the first process step ("Step c"). The method involves repeating step b and step c for at least a second process step performed by the manufacturing tool for manufacturing the semiconductor wafers ("Step d"). The method involves creating an nth mathematical model based on the metrology data and the data for the plurality of process variables for each of the n process steps ("Step e"). The method involves creating a top-level mathematical model based on the metrology data and the models created by steps c, d and e ("Step f"). The method involves calculating a multivariate metric based on the top-level model of step f and data for the plurality of process variables for at least one of the process steps performed by the manufacturing tool during subsequent runs of the manufacturing tool. The method involves servicing the manufacturing tool if the calculated multivariate metric satisfies a predetermined condition.

Any of the above aspects can include one or more of the following features. In some embodiments, the mathematical models of the process steps are partial least squares models. In some embodiments, creating the top-level model includes combining scores for the partial least squares models of the n process steps and the mathematical model of the metrology data. In some embodiments, the metrology data comprises yield measurements from semiconductor wafers produced by one or more manufacturing runs. In some embodiments, the multivariate metric is Hotelling's T2 statistic or a DModX statistic. In some embodiments, the top-level mathematical model includes process variables that affect yield of the manufacturing process. In some embodiments, the process variables that have a substantial effect on the metrology data are weighted more in creating the top-level mathematical model than process variables that do not have a substantial effect on the metrology data.

In another aspect, there is a system for monitoring a manufacturing tool used in a manufacturing process. The system includes a means for acquiring metrology data for semiconductor wafers at the conclusion of a final process step for a manufacturing process ("element a"). The system includes a means for acquiring data for a plurality of process variables for a first process step performed by the manufacturing tool for manufacturing semiconductor wafers ("element b"). The system includes a model generation module for creating a first mathematical model of the first process step performed by the manufacturing tool based on the metrology data and the acquired data for the plurality of process variables for the first process step performed by the manufacturing tool ("element c"). The system includes a means for acquiring data for a plurality of process variables for at least a second process step for manufacturing the semiconductor wafers and a model generation module for creating a second mathematical model of the second process step based on the metrology data and the acquired data for the plurality of process variables for the second process step ("element d"). The system includes a model generation module for creating an nth mathematical model based on the metrology data and the data for the plurality of process variables for each of the n process steps ("element e"). The system includes a model generation module for creating a top-level mathematical model based on the metrology data and the models created by elements c, d and e ("element f"). The system includes an analysis module for calculating a multivariate metric based on the top-level model created by element f and data for the plurality of process variables for at least one of the process steps performed by the manufacturing tool during subsequent runs of the manufacturing tool.

In some embodiments, the mathematical models of the process steps are partial least squares models. In some embodiments, creating the top-level model includes combining scores for the partial least squares models of the n process steps and the mathematical model of the metrology data. In some embodiments, the metrology data comprises yield measurements from semiconductor wafers produced by one or more runs of the manufacturing tool. In some embodiments, the multivariate metric is Hotelling's T2 statistic or the DModX statistic. In some embodiments, the top-level mathematical model includes process variables that affect yield of the process steps performed by the manufacturing tool. In some embodiments, the process variables that have a substantial effect on the metrology data are weighted more in creating the top-level mathematical model than process variables that do not have a substantial effect on the metrology data.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION THE INVENTION

Figure 1:
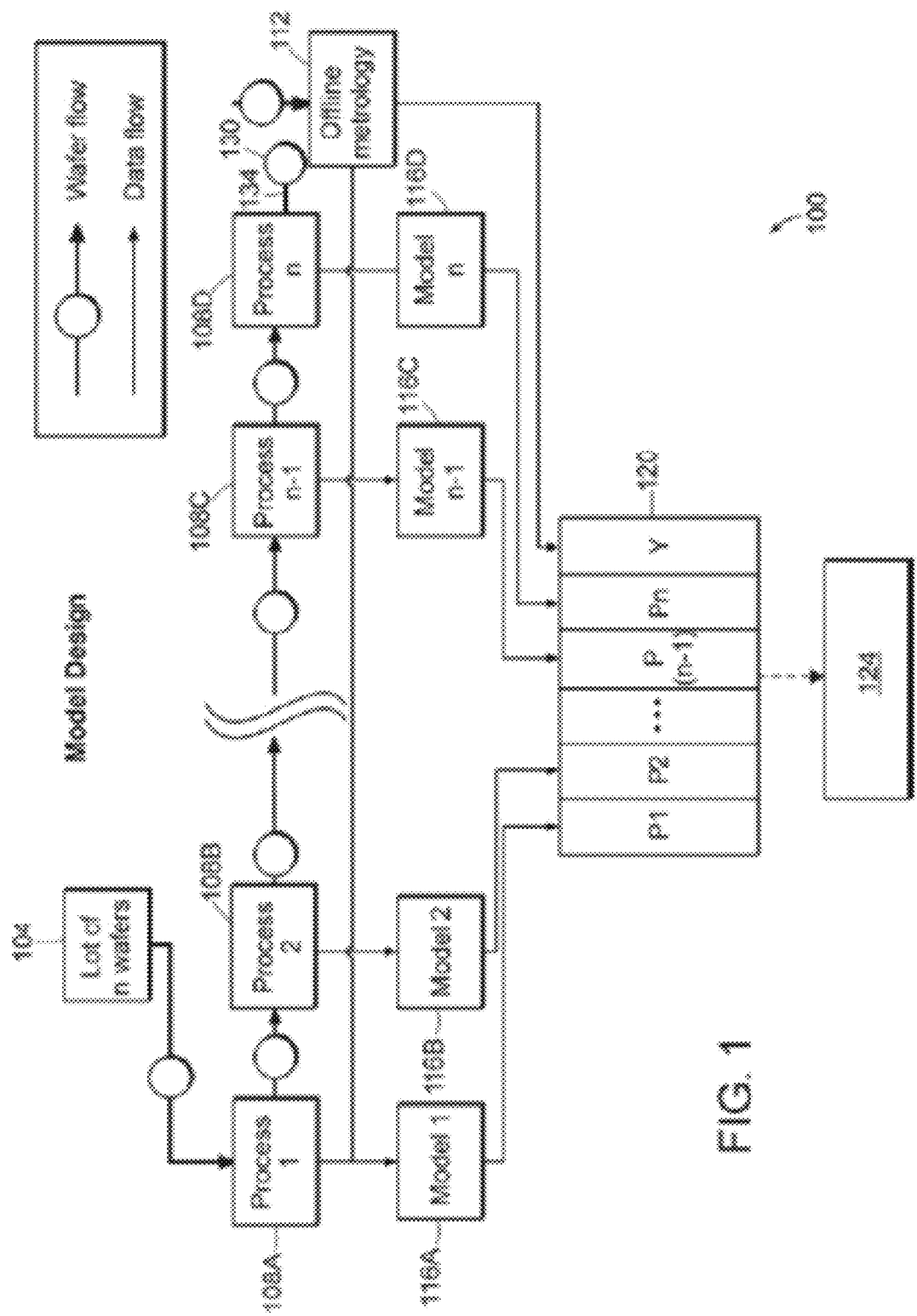
FIG. 1 is a schematic drawing depicting a model for monitoring a manufacturing process, according to an illustrative embodiment of the invention.

FIG. 1 is a schematic drawing depicting a method 100 for creating a model for monitoring a manufacturing process for manufacturing a lot of semiconductor wafers 104, according to an illustrative embodiment of the invention. The method 100 involves combining process data and yield data (e.g., metrology data) to create a model for process control of a manufacturing process and yield prediction for a manufacturing process. The manufacturing process includes a plurality of process steps 108A, 108B, 108C or 108D for processing the lot of semiconductor wafers 104. In this embodiment, the manufacturing process includes "n" number of process steps 108A, 108B, 108C or 108D. The method 100 involves acquiring metrology data 112 taken from the final output 134 of the plurality of process steps 108A, 108B, 108C or 108D. In some embodiments, the step 112 involves acquiring data for a plurality of process variables for the output 134. The data acquired for each of the process steps 108A, 108B, 108C or 108D can include, for example, data from a series of semiconductor deposition process steps, ion implant steps, material removal steps performed to manufacture the final semiconductor wafers 130.

The method 100 creates models based on the plurality of process steps 108A, 108B, 108C and 108D. The method 100 involves creating a first mathematical model 116A (generally 116) from data acquired from process step 108A and the metrology data 112 acquired from the final semiconductor wafers 130. This model generation (step 116) is repeated for at least a second process step (108B). In this embodiment, generation step 116 is repeated for each process step 108, thereby generating "n" mathematical models. In this embodiment, the step 116 of creating mathematical models (116A, 116B, 116C or 116D) includes using data acquired from the plurality of process steps 108A, 108B, 108C or 108D and the metrology data 112 to generate batch level Partial Least Squares (PLS) models for each process step. The method 100 also includes the step 120 of exporting batch level scores from each model 116A, 116B, 116C or 116D and merging the batch level scores with the metrology data 112. The method 100 also includes generating a top level mathematical model 124 that is based on those process variables that have a substantial effect on the metrology data 112.

In some embodiments, creating the mathematical models based on the data acquired involves using multivariate analysis techniques or neural network modeling techniques. By way of example, multivariate analysis techniques may be implemented by using the SIMCA-P+ multivariate analysis software package (Umetrics, offices in Kinnelon, N.J.). In one embodiment, the model creation step (e.g., step 116A) involves formatting in a matrix X (see EQN. 1) the metrology data acquired, step 112 for each process step, where the matrix X has N rows and K columns. K is the number of manufacturing related variables and N is the number of outputs (e.g., observations, number of wafers) of the specific manufacturing process (e.g., process step 108A).

$$X = \begin{bmatrix} 1 & \ldots & \ldots & \ldots & K \\ \ldots & \ldots & \ldots & \ldots & \ldots \\ \ldots & \ldots & \ldots & \ldots & \ldots \\ \ldots & \ldots & \ldots & \ldots & \ldots \\ N & \ldots & \ldots & \ldots & \ldots \end{bmatrix} \qquad \text{EQN. 1}$$

The model creation step involves calculating the average and standard deviation for each column K of the matrix X. The model creation step then involves centering and scaling each column K of the matrix X. The average of each column is subtracted from each entry in the corresponding column of the matrix X (centering). Each entry in the matrix X is then divided by the standard deviation of the corresponding column of the matrix X (scaling).

PCA Method

The Principal Component Analysis (PCA) method is then employed in developing a model. The PCA method reduces the number of dimensions (K variables) of the original data (original matrix X) down to a few independent variables that are a linear combination of the original data (K variables of original matrix X).

In one embodiment, the model developing step then involves determining the principal components and loadings of the model using an non-linear iterative non-linear partial least squares (NIPALS) method, as given by the following equation:

$$X = TP' + E \qquad \text{EQN 2}$$

where T is the scores matrix, P is the loading matrix, P' is the transpose of the P matrix, and E is the residual matrix. The scores matrix T is given by:

$$T = [t_1 t_2 \ldots t_A] \qquad \text{EQN. 3}$$

and the loading matrix P is given by:

$$P = [p_1 p_2 \ldots p_A] \qquad \text{EQN. 4}$$

where, for example, $t_1$ is the 1$^{st}$ principal component and $p_1$ is the 1$^{st}$ load vector. The 1$^{st}$ principal component ($t_1$) is also referred to as the 1$^{st}$ score vector of the X matrix and is a linear combination of the manufacturing related variables. The 2$^{nd}$ principal component ($t_2$) is also referred to as the 2$^{nd}$ score vector of the X matrix and is a linear combination of the manufacturing related variables. The subscript A is the total number of principal components used to produce the model.

The NIPALS method then involves iteratively employing the following equations:

$$p_1' = \frac{t_1' X}{t_1' t_1} \qquad \text{EQN. 5}$$

where starting with an initial condition for the $t_1$ vector initially equal to the column of the X matrix (EQN. 1) having the maximum variance.

The NIPALS method then involves normalizing $p_1$ as follows:

$$\|p_1\| = 1.0 \qquad \text{EQN. 6}$$

and then employing the following equation:

$$t_1 = \frac{X p_1}{p_1' p_1} \qquad \text{EQN. 7}$$

The calculations of EQNS. 5-7 are then repeated until the calculations converge. By way of example, a user may specify (based on user experience) that the calculations have converged when $$\frac{\|t_1 - t_{1old}\|}{\|t_1\|} \langle 1e - 6 \qquad \text{EQN. 8}$$

where $t_{1old}$ is the value of $t_1$ from the prior iteration of performing the calculations using EQNS. 5-7.

The residual matrix E is then determined from the following relationship:

$$E = X - t_1 p_1' \qquad \text{EQN. 9}$$

The residual matrix E is then used in place of matrix X in EQNS. 5 and 7 to calculate the second principal component ($t_2$) and the second load vector ($p_2$). The steps associated with EQNS. 5-9 are then similarly performed for each additional principal component ($t_A$). The methods described herein are applicable to applications involving multiple numbers of principal components.

Principal component coefficients for each observation (e.g., output of the manufacturing process) are then calculated using the equations ($t_A$ vectors) of the principal components (EQN. 3). Users generally use the principal component coefficients to determine if there is any clustering associated with the coefficients. Those principal component coefficients that are close to each other when plotted in A-dimensional space may sometimes have similar properties (where A is the total number of principal components used to produce the model). However, in many cases it is not possible to identify similarities and dissimilarities based on the principal component coefficients because all the original manufacturing related variables have been used to develop the model and each of the variables has been given similar weight (the principal component score is the linear combination of all the variables multiplied by its weight). Accordingly, it is therefore necessary to identify those manufacturing related variables that have a substantial effect on the model for detecting faulty outputs of the manufacturing process.

Identifying the manufacturing related variables that have a substantial effect can involve performing a partial least squares discrimination analysis (PLSDA) in which those manufacturing related variables are selected that have a substantial effect on the model for detecting faulty outputs of the manufacturing process.

PLS and PLSDA Method

The PLS and PLSDA method is employed as given by the following equations:

$$X = TP' + E \qquad \text{EQN. 10}$$

$$Y = UC' + F \qquad \text{EQN. 11}$$

$$T = XW^* \qquad \text{EQN. 12}$$

$$Y = BX + E \qquad \text{EQN. 13}$$

$$B = W(P'W)^{-1}C' \qquad \text{EQN. 14}$$

where Y is an (M×N) matrix that contains data associated with M features of the N observations, B is the regression coefficient, and where $$W^* = W(P'W)^{-1} \qquad \text{EQN. 15}$$

The M features may, for example, be a specific metrology metric value associated with each observation (e.g., each wafer) or a class identifier.

T is the score matrix of X, and U is the score matrix of Y. W is the X-weight matrix and C is the Y-weight matrix. F is the residual matrix associated with Y. The W matrix is given by:

$$W = [w_1 w_2 \ldots w_A] \qquad \text{EQN. 16}$$

and the C matrix is given by:

$$C = [c_1 c_2 \ldots c_A] \qquad \text{EQN. 17}$$

Similarly as previously described herein, the NIPALS method is used in accordance with the following equations:

$$w_1 = \frac{X^T u_1}{u_1^T u_1} \qquad \text{EQN. 18}$$

Where $u_1$ is set to be equal to one column of the Y matrix as an initial condition. The vector $w_1$ is then scaled to unit length by:

$$\|w_1\| = 1.0 \qquad \text{EQN. 19}$$

The next step in the NIPALS method involves:

$$t_1 = X w_1 \qquad \text{EQN. 20}$$

$$c_1 = \frac{Y^T t_1}{t_1^T t_1} \qquad \text{EQN. 21}$$

$$u_1 = \frac{Y c_1}{c_1^T c_1} \qquad \text{EQN. 22}$$

where the calculations of EQNS. 18-22 are repeated until the calculations converge. By way of example, a user may specify (based on user experience) that the calculations have converged when $$\frac{\|t_1 - t_{1old}\|}{\|t_1\|} < 1e - 6 \qquad \text{EQN. 23}$$

where $t_{1old}$ is the value of $t_1$ from the prior iteration of performing the calculations using EQNS. 18-22.

Once the calculations have converged, the X loadings are determined from:

$$p_1 = \frac{X^T t_1}{t_1^T t_1} \qquad \text{EQN. 24}$$

The residual matrix E is then determined from the following relationship:

$$E = X - t_1 p_1^t \qquad \text{EQN. 25}$$

The residual matrix F is then determined from the following relationship:

$$F = Y - t_1 c_1^t \qquad \text{EQN. 26}$$

The residual matrices E and F are then used in place of matrices X and Y in EQNS. 18-26 to calculate the second principal component ($t_2$), second load vector ($p_2$), second score vector of Y ($u_2$), second X-weight vector ($w_2$), and second Y-weight vector ($c_2$). The steps associated with EQNS. 18-26 are then similarly performed for each additional principal component ($t_A$). The methods described herein are applicable to applications involving multiple numbers of principal components.

The next step in determining which of the K manufacturing related variables have a substantial effect on the model detecting the fault condition of the manufacturing process involves plotting the W* matrix and the C matrix. If there are two features (M), then the C matrix will have two values $C_1$ and $C_2$ for each feature which are plotted as coordinates in a plane. The W* matrix contains two values for each manufacturing related variable which also are plotted as coordinates in the same plane.

In this manner, the coordinate values of W* and C are superimposed on each other. Those manufacturing related variable coordinates (W*) that are located in the plane in proximity to a feature have a substantial effect on the model being able to predict whether a given wafer has that particular feature. Only those columns (K) corresponding to the substantial manufacturing related variables are then used to update the model using EQNS. 1-9. The updated model is then capable of distinguishing between outputs of the manufacturing process to identify which outputs are faulty.

EQNS. 1-26 can be used at an individual process level (e.g., including one or more process steps) and/or at a combined process level (e.g., including one or more processes, each of which can include one or more process steps). For example, EQNS. 1-26 as described above can be used in a method for creating a mathematical model for each process step, according to an illustrative embodiment. In one embodiment, EQNS. 1-26 as described above are used in a method for creating a mathematic model for an individual process.

Generating a Top Level Mathematical Model:

In some embodiments, an unfolding process is used to generate the top level mathematical model. Two methods can be used to generate a top level mathematical model: i) one method uses the actual data itself (e.g., data acquired for each of the process steps 108A, 108B, 108C or 108D of FIG. 1) and ii) the other method uses the scores from a lower level model. For example, EQNS. 27-29 are examples of matrix representations of the unfolded data. For example, a 3 step process can last 30 seconds with 10 wafers. In this example, the matrices for the data collection (lower level) would have the following form:

$$\text{Step 1:} \begin{pmatrix} k_{1,1} & k_{2,1} & k_{3,1} & k_{4,1} \\ k_{1,2} & k_{2,2} & k_{3,2} & k_{4,2} \\ k_{1,3} & k_{2,3} & k_{3,3} & k_{4,3} \\ k_{1,4} & k_{2,4} & k_{3,4} & k_{4,4} \\ k_{1,5} & k_{2,5} & k_{3,5} & k_{4,5} \\ k_{1,6} & k_{2,6} & k_{3,6} & k_{4,6} \\ k_{1,7} & k_{2,7} & k_{3,7} & k_{4,7} \\ k_{1,8} & k_{2,8} & k_{3,8} & k_{4,8} \\ k_{1,9} & k_{2,9} & k_{3,9} & k_{4,9} \\ k_{1,10} & k_{2,10} & k_{3,10} & k_{4,10} \end{pmatrix} \qquad \text{EQN. 27}$$

-continued $$\text{Step 2: } \begin{pmatrix} k_{1,1} & k_{2,1} & k_{3,1} & k_{4,1} \\ k_{1,2} & k_{2,2} & k_{3,2} & k_{4,2} \\ k_{1,3} & k_{2,3} & k_{3,3} & k_{4,3} \\ k_{1,4} & k_{2,4} & k_{3,4} & k_{4,4} \\ k_{1,5} & k_{2,5} & k_{3,5} & k_{4,5} \\ k_{1,6} & k_{2,6} & k_{3,6} & k_{4,6} \\ k_{1,7} & k_{2,7} & k_{3,7} & k_{4,7} \\ k_{1,8} & k_{2,8} & k_{3,8} & k_{4,8} \\ k_{1,9} & k_{2,9} & k_{3,9} & k_{4,9} \\ k_{1,10} & k_{2,10} & k_{3,10} & k_{4,10} \end{pmatrix} \quad \text{EQN. 28}$$

$$\text{Step 3: } \begin{pmatrix} k_{1,1} & k_{2,1} & k_{3,1} & k_{4,1} \\ k_{1,2} & k_{2,2} & k_{3,2} & k_{4,2} \\ k_{1,3} & k_{2,3} & k_{3,3} & k_{4,3} \\ k_{1,4} & k_{2,4} & k_{3,4} & k_{4,4} \\ k_{1,5} & k_{2,5} & k_{3,5} & k_{4,5} \\ k_{1,6} & k_{2,6} & k_{3,6} & k_{4,6} \\ k_{1,7} & k_{2,7} & k_{3,7} & k_{4,7} \\ k_{1,8} & k_{2,8} & k_{3,8} & k_{4,8} \\ k_{1,9} & k_{2,9} & k_{3,9} & k_{4,9} \\ k_{1,10} & k_{2,10} & k_{3,10} & k_{4,10} \end{pmatrix} \quad \text{EQN. 29}$$

In some embodiments, the same parameters ($k_{\#,\#}$) are not measured in each process step. For example, some, all or none of the parameters can be the same for each process step. In some embodiments, each step does not have to have the same number of samples (e.g., step one could last 10 seconds, step 2 could last 20 seconds, and step three could last 2 seconds). In some embodiments, the steps do not have to be sampled at the same sampling rate. In this embodiment, EQNS. 27-29 are selected to demonstrate the unfolding process, where the form of the matrices repeats itself for each of the wafers (10 in this example) monitored.

Method 1—Unfolding of Actual Data

In this embodiment, the method involves transforming each matrix (e.g., matrix of EQN. 27) into a vector and combining the vectors to make a single row to be used in the top level model. In this embodiment, step 1 transforms into the following vector:

$$(k_{1,1,1}, k_{1,2,1} \Lambda k_{1,4,1}, k_{1,1,2} \Lambda k_{1,4,2}, k_{1,1,3} K k_{1,4,10}) \quad \text{EQN. 30}$$

where the subscripts $k_{x,y,z}$ are
  x=process step
  y=parameter
  z=observation id
where "observation id" refers to a row of data from the individual process steps. Similarly, the other two steps would transform into the following two vectors $$(k_{2,1,1}, k_{2,2,1} \Lambda k_{2,4,1}, k_{2,1,2} \Lambda k_{2,4,2}, k_{2,1,3} K k_{2,4,10}) \quad \text{EQN. 31}$$

and $$(k_{3,1,1}, k_{3,2,1} \Lambda k_{3,4,1}, k_{3,1,2} \Lambda k_{3,4,2}, k_{3,1,3} K k_{3,4,10}) \quad \text{EQN. 32}$$

In this embodiment, these vectors (EQNS. 30, 31, and 32) are then combined to form a single row representing a single wafer that would have the following form:

$$(k_{1,1,1}, k_{1,2,1} \Lambda k_{1,4,10}, k_{2,1,1}, k_{2,2,2} \Lambda k_{2,4,10}, k_{3,1,1}, k_{3,2,1} \Lambda k_{3,4,10}) \quad \text{EQN. 33}$$

In this embodiment, the top level model would have the form of a matrix having as many rows as there are wafers. Each row would have the form of EQN. 33. Unfolded matrix (e.g., which can include a row represented by EQN. 33) can be used to solve EQN. 10 (e.g., the X portion of the PLS model).

After X is solved, and Y is solved, the correlation between X and Y can be found (e.g., as described in the PLS and PSLDA method section above) to generate the top level model.

Method 2—Unfolding of Scores

Observation level data is unfolded into the top level model. One exemplary method uses raw data (e.g., as described above) and another method uses scores. In this embodiment, the MVA model is run on the lower level data as defined above in EQNS. 27-29. By way of example only, step 1 can have 2 principal components, step 2 can have 3 principal components, and step 3 can have 2 principal components. The scores matrices for these steps would have the following forms, where the score matrices have as many columns as there are principal components for the step:

$$\text{Step 1: } \begin{pmatrix} t_{1,1} & t_{2,1} \\ t_{1,2} & t_{2,2} \\ t_{1,3} & t_{2,3} \\ t_{1,4} & t_{2,4} \\ t_{1,5} & t_{2,5} \\ t_{1,6} & t_{2,6} \\ t_{1,7} & t_{2,7} \\ t_{1,8} & t_{2,8} \\ t_{1,9} & t_{1,9} \\ t_{1,10} & t_{2,10} \end{pmatrix} \quad \text{EQN. 34}$$

$$\text{Step 2: } \begin{pmatrix} t_{1,1} & t_{2,1} & t_{3,1} \\ t_{1,2} & t_{2,2} & t_{3,2} \\ t_{1,3} & t_{2,3} & t_{3,3} \\ t_{1,4} & t_{2,4} & t_{3,4} \\ t_{1,5} & t_{2,5} & t_{3,5} \\ t_{1,6} & t_{2,6} & t_{3,6} \\ t_{1,7} & t_{2,7} & t_{3,7} \\ t_{1,8} & t_{2,8} & t_{3,8} \\ t_{1,9} & t_{1,9} & t_{3,9} \\ t_{1,10} & t_{2,10} & t_{3,10} \end{pmatrix} \quad \text{EQN. 35}$$

$$\text{Step 3: } \begin{pmatrix} t_{1,1} & t_{2,1} \\ t_{1,2} & t_{2,2} \\ t_{1,3} & t_{2,3} \\ t_{1,4} & t_{2,4} \\ t_{1,5} & t_{2,5} \\ t_{1,6} & t_{2,6} \\ t_{1,7} & t_{2,7} \\ t_{1,8} & t_{2,8} \\ t_{1,9} & t_{1,9} \\ t_{1,10} & t_{2,10} \end{pmatrix} \quad \text{EQN. 36}$$

Alternatively, in another embodiment actual process data (e.g., see before) is used. A similar process as used above with the raw data method would translate the three matrices (e.g., EQNS 34-36) using scores, into the following vectors:

for step 1, $$(t_{1,1}, t_{2,1}, t_{1,2}, t_{2,2}, \Lambda, t_{1,10}, t_{2,10}) \quad \text{EQN. 37}$$

for step 2, $$(t_{1,1}, t_{2,1}, t_{3,1}, t_{1,2}, t_{2,2}, \Lambda, t_{2,10}, t_{3,10}) \quad \text{EQN. 38}$$

and for step 3

$$(t_{1,1}, t_{2,1}, t_{1,2}, t_{2,2}, \Lambda, t_{1,10}, t_{2,10}) \quad \text{EQN. 39}$$

In this embodiment, the three steps would be combined into a single row of the top level model representing a single wafer and would look like $$(t_{1,1,1}, t_{1,2,1}, t_{1,1,2}\Lambda t_{1,1,10}, t_{2,1,10}, t_{2,1,1}, t_{2,2,1}, t_{2,3,1}\Lambda t_{2,1,10}, t_{2,2,10}, t_{2,3,10}, t_{3,1,1}, t_{3,2,1}\Lambda t_{3,1,10}, t_{3,2,10}) \quad \text{EQN. 40}$$

where the subscripts x, y, z represent:
x=step
y=principal component
z=sample

Unfolded matrix (e.g., which can include a row represented by EQN. 40) can be used to solve equation 10 (the X portion of the PLS model). After X is solved, and Y is solved, the correlation between X and Y can be found (as described in the PLS section above) to generate a top level model.

Unfolding Multiple Processes

In some embodiments, unfolding multiple processes can work in a substantially similar fashion as unfolding multiple steps. In some embodiments, the method can include properly identifying wafers so the process data process to process remains within the same wafer.

In this embodiment, the processes can be defined as the steps are defined. In this embodiment, the lower level to top level unfolding has already been performed. The process matrices can look like:

$$\begin{pmatrix} t_{1,1,1,1} & t_{1,1,2,1} & t_{1,1,3,1} & \Lambda & t_{1,s,v,n} \\ t_{2,1,1,1} & t_{2,1,2,1} & t_{2,1,3,1} & \Lambda & t_{2,s,v,n} \\ & & M & & \\ T_{w,1,1,1} & t_{w,1,2,1} & t_{w,1,3,1} & \Lambda & t_{w,s,v,n} \end{pmatrix} \quad \text{EQN. 41}$$

where the subscripts w, s, v, n represent
w=wafer
s=process step
v=principal component (or alternatively, if modeling with raw data, variable)
n=observation number In this embodiment, when multiple processes are combined, then the combined matrix will be structured according to:

$$\begin{pmatrix} t_{1,1,1,1,1} & t_{1,1,1,2,1} & \Lambda & t_{1,1,s,v,n} & t_{1,2,1,1,1} & t_{1,2,1,2,1} & \Lambda & t_{1,2,s,v,n} & \Lambda & t_{1,p,1,1,1} & t_{1,p,1,2,1} & \Lambda & t_{1,p,s,v,n} \\ t_{2,1,1,1,1} & t_{2,1,1,2,1} & \Lambda & t_{2,1,s,v,n} & t_{2,2,1,1,1} & t_{2,2,1,2,1} & \Lambda & t_{2,2,s,v,n} & \Lambda & t_{2,p,1,1,1} & t_{2,p,1,2,1} & \Lambda & t_{2,p,s,v,n} \\ & & & & & M & & & & & & & \\ t_{w,1,1,1,1} & t_{w,1,1,2,1} & \Lambda & t_{w,1,s,v,n} & t_{w,2,1,1,1} & t_{w,2,1,2,1} & \Lambda & t_{w,2,s,v,n} & \Lambda & t_{w,p,1,1,1} & t_{w,p,1,2,1} & \Lambda & t_{w,p,s,v,n} \end{pmatrix} \quad \text{EQN. 42}$$

where the subscripts now account for
w=wafer
p=process
s=process step
v=principal component (or, alternatively, if modeling with raw data, variable)
n=observation number EQNS. 27-42 as described above, define exemplary methods for combining multiple processes and steps. EQNS. 27-42 generate an "X Matrix" (e.g., an "nth" mathematical model) that can be used to solve EQN. 10 as described above. EQN. 10 can be combined with the "Y data" (e.g., metrology data) to complete a PLS top level model. In embodiments in which the models are based on scores rather than raw data, a top level matrix is generated that combines each of the multiple processes by using individual PLS models.

Figure 2:
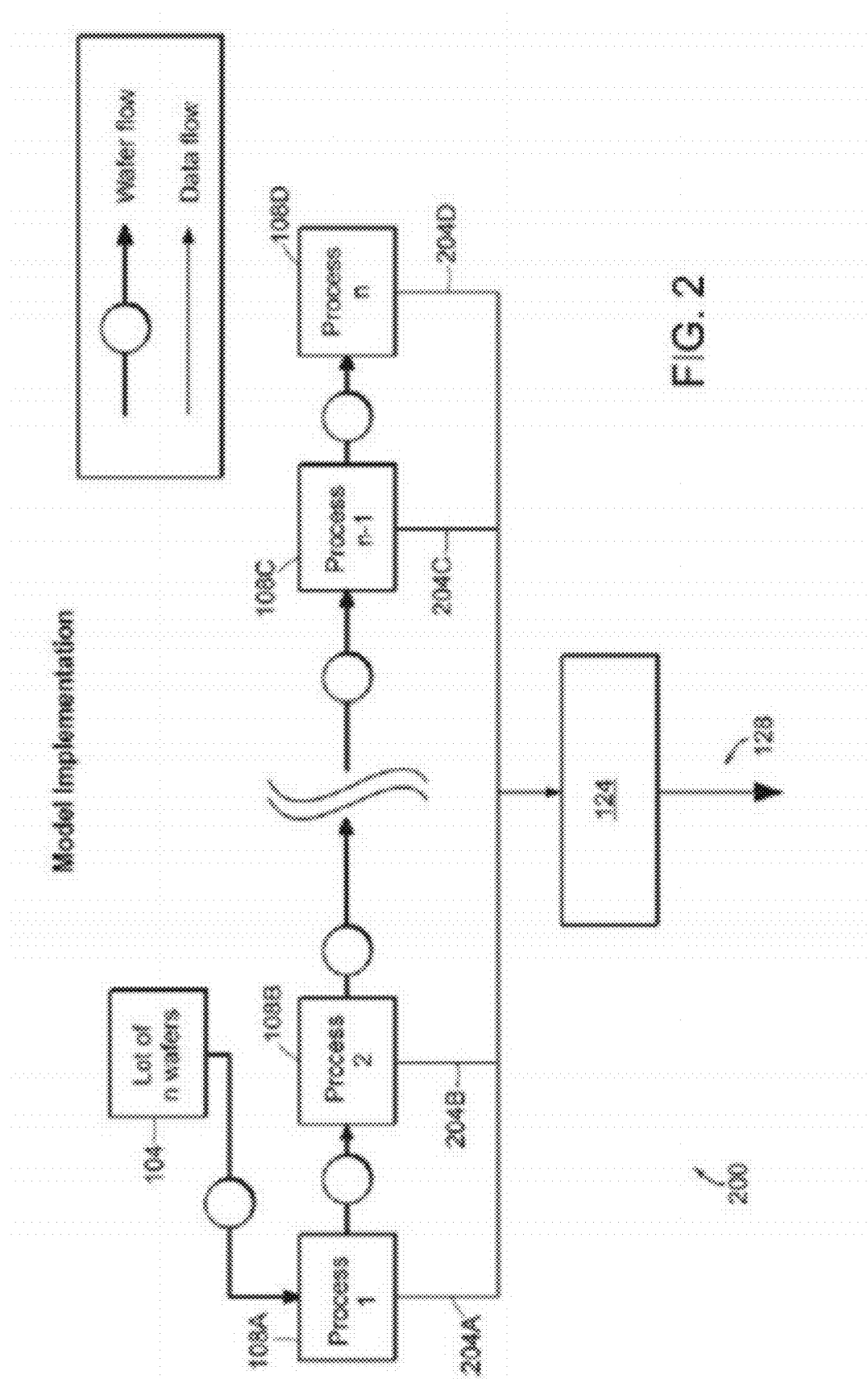
FIG. 2 is a schematic drawing depicting implementing a model for monitoring a manufacturing process, according to an illustrative embodiment of the invention.

FIG. 2 is a schematic drawing depicting a method for implementing a model 200 for monitoring a manufacturing process for manufacturing a lot of semiconductor wafers 104, according to an illustrative embodiment of the invention. The method 200 involves performing at least two process steps 108A and 108B and acquiring data 204A and 204B (generally 204) for the output of the two process steps 108A and 108B, respectively. In this embodiment, the method 200 includes up to "n" process steps 108A, 108B, 108C and 108D. The data acquired (204A, 204B, 204C and 204D) for each of the "n" process steps is provided to a model (e.g., the model 124 of FIG. 1). The model 124 is then used to generate an output 128 that is a prediction of the occurrence of a fault and/or classification of the fault identified in one or more of the wafers. The model can be used to identify a fault or classify a fault in one or more of the process steps and/or in the final wafers output by performing each of the "n" process steps 108A, 108B, 108C and 108D.

Figure 3:
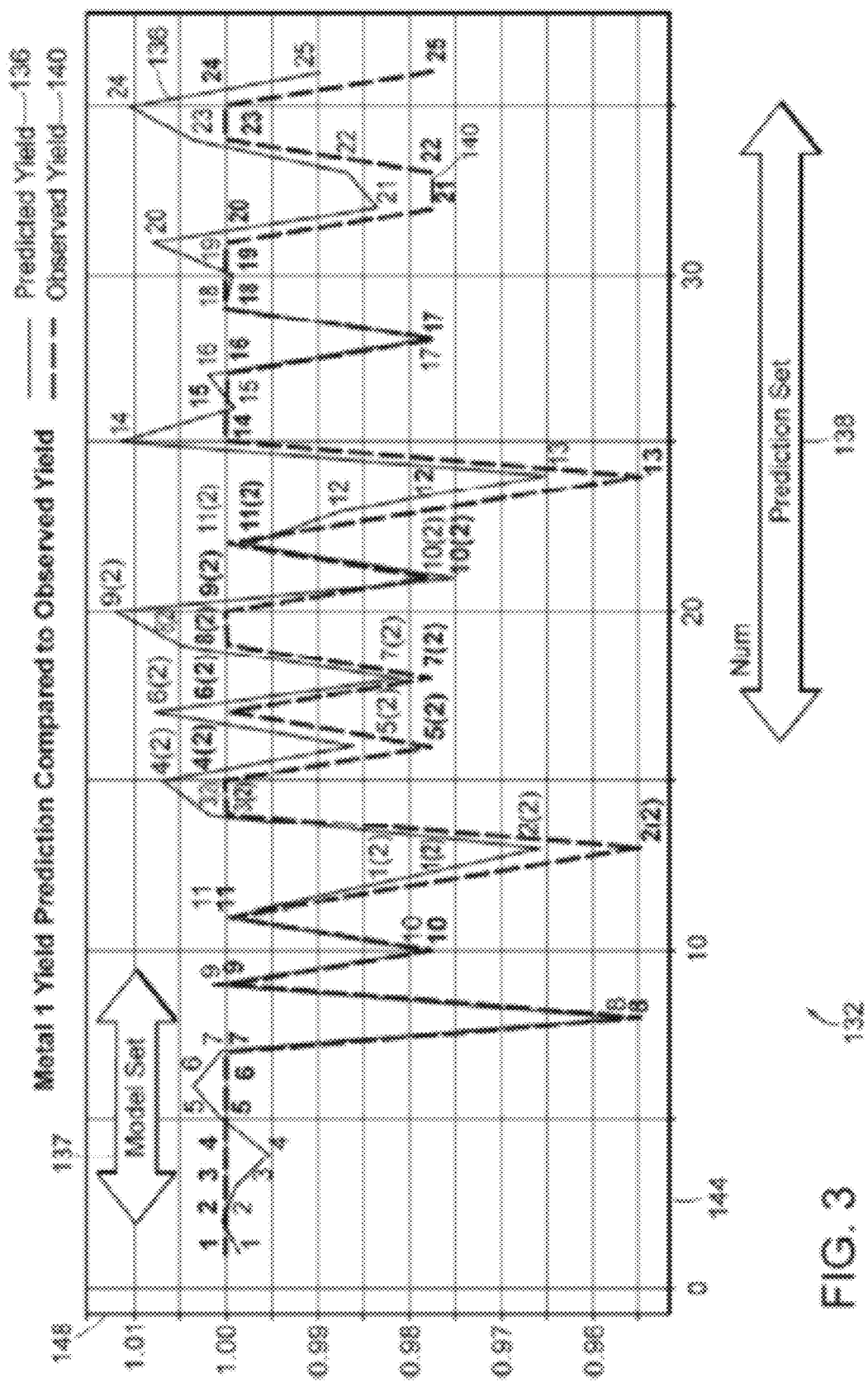
FIG. 3 is a graph comparing a predicted yield of a manufacturing process based on a model to an observed yield of the manufacturing process, according to an illustrative embodiment of the invention.

FIG. 3 is a graph comparing a predicted yield 136 of a manufacturing process to an observed yield 140 of a manufacturing process, according to an illustrative embodiment of the invention. The predicted yield was created using a top level mathematical model, for example, the top level mathematical model 124 of FIGS. 1 and 2. The top level model was created using metrology data and process data from a first lot of 11 wafers (137 in FIG. 3). The model was then used to predict the yield for a second lot of 25 wafers (labeled as the prediction set 138). The graph in FIG. 3 displays two lines for the prediction set. The first line, labeled 136, is the predicted yield, based on the model. The second line, labeled 140, is the actual measured yield, measured after the completion of the device fabrication of the manufacturing process that produces the devices from the wafers (e.g., semiconductor devices). The similarity of the lines 136 and 140 demonstrates the efficacy of the model to predict process yield. The y-axis 148 represents yield of the process measured from 0, meaning no functional devices, to 1, meaning 100% functional devices on a given wafer.

The above-described model creation techniques can be used to create a model for monitoring a manufacturing tool used in a manufacturing process to facilitate determining when the tool requires servicing. Servicing a manufacturing tool before or after the time when the tool actually needs servicing can be inefficient. For example, typical manufacturing tool service is carried out under several circumstances. In some cases, preventative maintenance is carried out periodically (e.g., monthly, weekly, bi-weekly, etc.) and/or based on the number of processes or batches that the manufacturing tool has performed (e.g., number of processed wafers, number of process events, etc.). Preventative maintenance is often carried out even when the manufacturing tool is running properly. While this practice creates predictable tool downtime, frequent and/or unnecessary preventive maintenance will reduce the manufacturing tool's uptime and thus reduce the tool's output.

In some cases, preventive maintenance is not performed and servicing is delayed until the manufacturing tool malfunctions or fails to perform up to specification. In such cases, the cost of the downtime and misprocessing of materials by the manufacturing tool can be significant. In both cases, preventative maintenance and service in response to malfunction, the manufacturing tool is brought down or taken offline, and time-consuming service is performed on the manufacturing tool to bring it back to production condition.

A manufacturing tool's efficiency can be increased by reducing the manufacturing tool's downtime for service. One approach to improving efficiency by reducing a manufacturing tool's downtime for service is to bring the tool down for service at or about the time it needs service, not before it needs service and not after it has malfunctioned. In some implementations, the techniques described above can be used to develop a model of a manufacturing tool that can be used to determine when the tool begins to drift out of specification and should be serviced. In some implementations, the techniques described above can be used to develop a model of a manufacturing tool that can be used to predict when the tool will drift out of specification, such that service can be performed prior to the tool drifting out of specification. Leveraging these techniques, manufacturing tool downtime due to service can be reduced.

Figure 4:
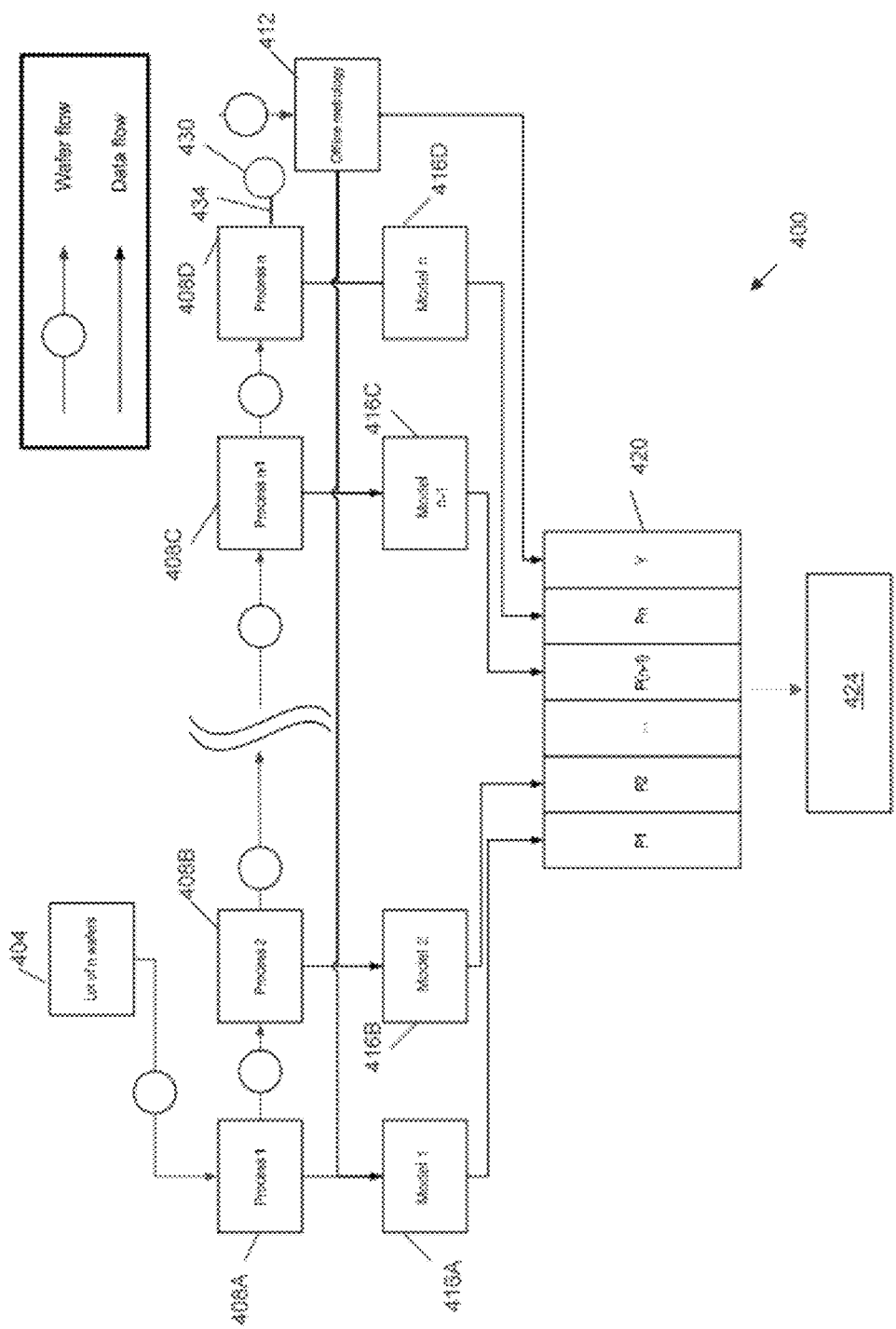
FIG. 4 is a schematic drawing depicting a method for creating a model for monitoring a manufacturing tool used in a manufacturing process.

FIG. 4 is a schematic drawing depicting a method 400 for creating a model for monitoring a manufacturing tool used in a manufacturing process (e.g., production of semiconductor wafers). The method 400 involves combining process data and metrology data to create a model for the manufacturing tool. The illustrated manufacturing process includes a plurality of process steps 408A, 408B, 408C or 408D performed by a manufacturing tool for processing the lot of semiconductor wafers 404. In this embodiment, the manufacturing process includes "n" number of process steps 408A, 408B, 408C or 408D. The method 400 involves acquiring process data for each of process steps 408A, 408B, 408C or 408D and metrology data 412 taken from the final output 434 of the plurality of process steps 408A, 408B, 408C or 408D. The data acquired for each of the process steps 408A, 408B, 408C or 408D can include, for example, data from a series of semiconductor deposition process steps, ion implant steps, and/or material removal steps performed to manufacture the final semiconductor wafers 430.

For example, data can be collected from a deposition tool to build a model for monitoring the tool's health. The deposition tool can perform a plurality process steps, including a plurality of heating steps, a plurality of ramping steps, and a plurality of deposition steps. Process data (e.g., gas flow, temperature, power, pressure and throttle valve angle) can be collected for one or more of the process steps. Metrology data can be collected after the deposition tool has completed the process steps. For example, metrology data can include thickness, defect count, resistivity, or critical dimension.

As another example, data can be collected from a throttle valve to build a model for monitoring the tool's health. Process data (e.g., throttle valve position, process pressure, flow rate, and temperature) can be collected during one or more process steps. Metrology data can be collected after the process steps have completed.

The method 400 creates models based on the plurality of process steps 408A, 408B, 408C and 408D. The method 400 involves creating a first mathematical model 416A (generally 416) from process data acquired from process step 408A and the metrology data 412. This model generation (step 416) is repeated for at least a second process step (408B). In this embodiment, generation step 416 is repeated for each process step 408, thereby generating "n" mathematical models. In this embodiment, the step 416 of creating mathematical models (416A, 416B, 416C or 416D) includes using data acquired from the plurality of process steps 408A, 408B, 408C or 408D and the metrology data 412 to generate batch-level Partial Least Squares (PLS) models for each process step. The method 400 also includes the step 420 of exporting batch level scores from each model 416A, 416B, 416C or 416D and merging the batch level scores with the metrology data 412. The method 400 also includes generating a top level mathematical model 424 that is based on those PLS models 416A, 416B, 416C and 416D for each of process steps 408A, 408B, 408C and 408D.

The models 416A, 416B, 416C and 416D for each of process steps 408A, 408B, 408C and 408D and top-level model 424 can be created using the multivariate techniques previously described (e.g., Equations 1-42).

The top-level model 424 can be used to monitor the manufacturing tool and assess the manufacturing tools health (e.g., whether the tool is performing within specification). For example, the top-level model 424 can be used to determine when the tool should be serviced. In some embodiments, process data (e.g., process data similar to that used to generate the models 416A, 416B, 416C, 416D, and 424) can be collected from the manufacturing tool during subsequent runs of the manufacturing tool. The process data collected during subsequent runs can be compared to the top-level model 424. Multivariate statistics can be calculated based on the top-level model and the process data collected during subsequent runs. In some embodiments, Hotelling's $T^2$ and DModX statistics can be calculated based on the top-level model and the process data collected during subsequent runs. As the Hotelling's $T^2$ metric increases, it is more likely that the process data collected during subsequent runs deviates significantly from the top-level model 424, which can indicate that the manufacturing tool is drifting out of specification and should be serviced. For example, if the model is built correctly, when Hotelling's $T^2$ goes above the 95% critical limit, then preventive maintenance should be performed. The DModX statistic can be used to determine whether the top-level model is still useful for predicting when the manufacturing tool needs servicing. In general, DModX can be a little more flexible; for example, if it goes above 2 times its critical value, then the tool should be serviced.

Figure 5:
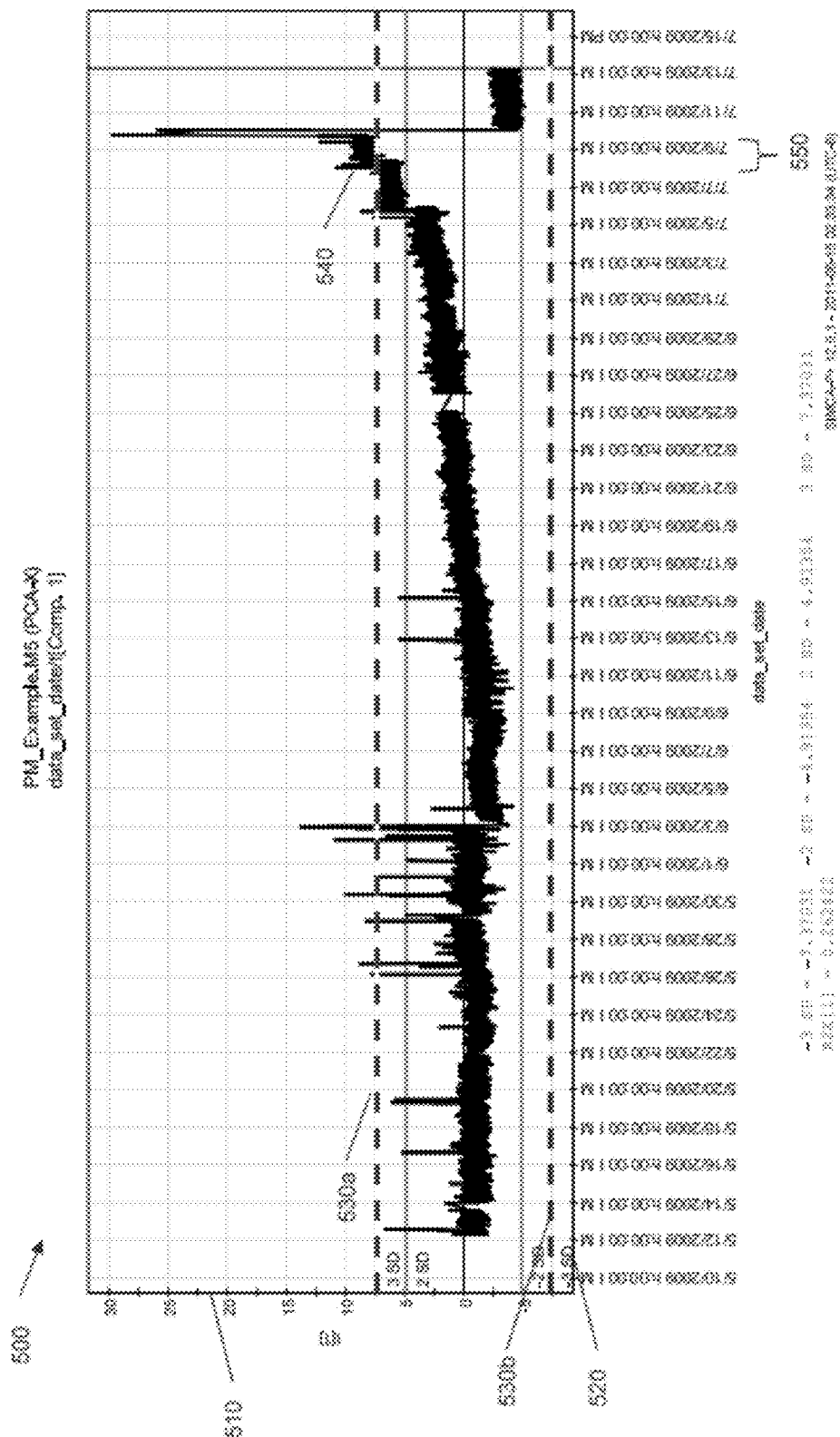
FIG. 5 is a graph displaying the first principal component from the top-level model along the Y axis and the date on which process data are collected along the X axis.

FIG. 5 is a graph 500 displaying the first principal component from the top-level model along the Y axis 510 and the date on which process data are collected along the X axis 520. The dashed lines indicate pre-determined limits 530a and 530b. The collected process data are plotted over time on graph 500. As time goes by, the process data drift toward pre-determined limit 530a, and, at or about point 540, go beyond pre-determined limit 530a. Preventive maintenance is performed at or about time 550 and the process data return to within pre-determined limits 530a and 530b.

Figure 6:
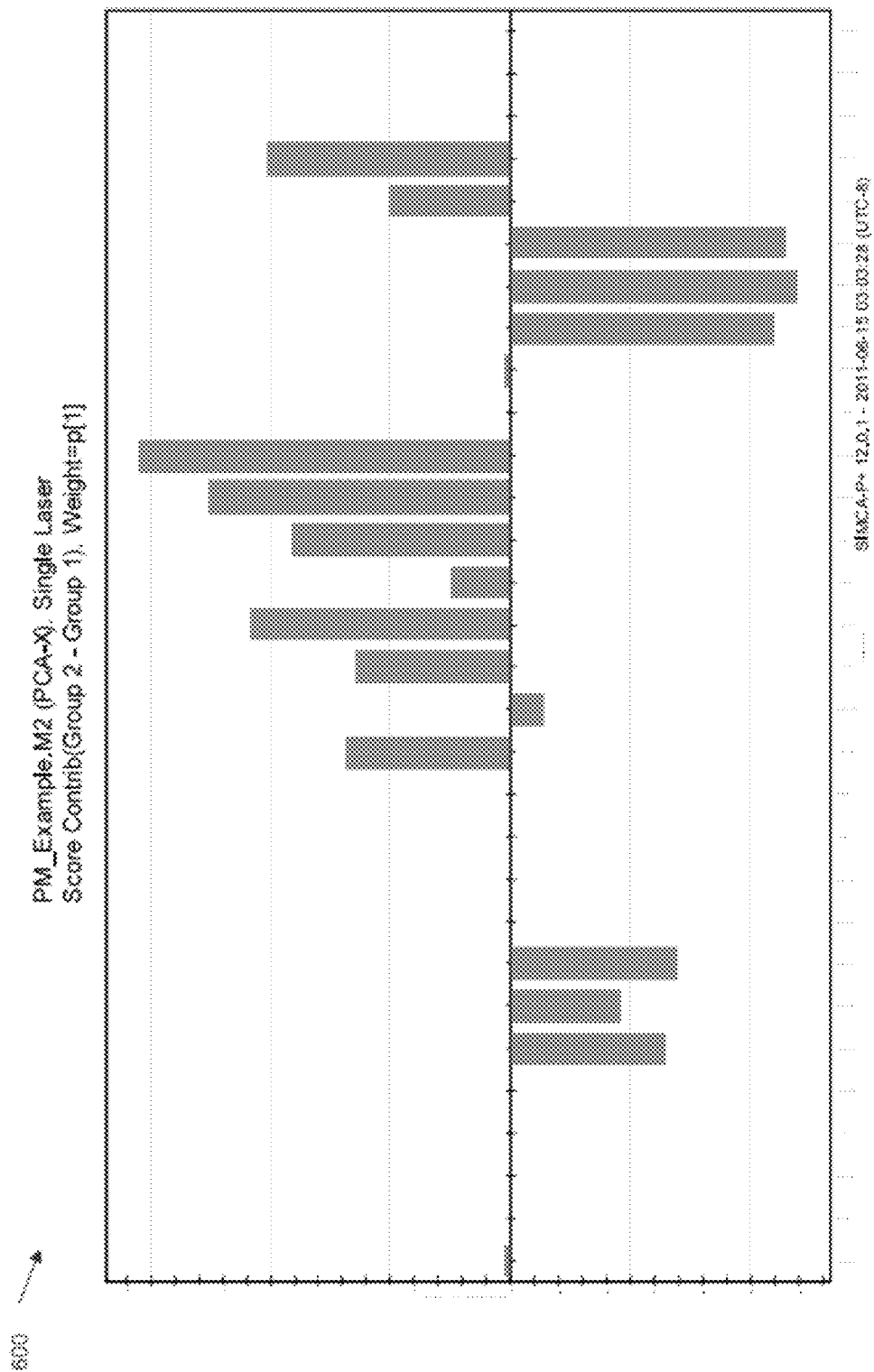
FIG. 6 is a graph displaying the process variables and their relative change in standard deviation units before and after the preventative maintenance event shown in FIG. 5.

FIG. 6 is a graph 600 displaying the process variables and their relative change in standard deviation units before and after the preventative maintenance event shown in FIG. 5 at time 550. Positive bars mean process variable values were larger after the preventative maintenance, and negative bars mean the process variable values were smaller after the preventative maintenance.

The above-described techniques can be implemented in digital electronic circuitry, or in computer hardware, firmware, software, or in combinations of them. The implementation can be as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communications, e.g., a communications network. Examples of communications networks, also referred to as communications channels, include a local area network ("LAN") and a wide area network ("WAN"), e.g., the Internet, and include both wired and wireless networks. In some examples, communications networks can feature virtual networks or sub-networks such as a virtual local area network ("VLAN"). Unless clearly indicated otherwise, communications networks can also include all or a portion of the publicly-switched telephone network ("PSTN"), for example, a portion owned by a specific carrier.

While the invention has been particularly shown and described with reference to specific illustrative embodiments, it should be understood that various changes in form and detail may be made without departing from the spirit and scope of the invention.

What is claimed is:

1. A method for monitoring a manufacturing tool used in a manufacturing process, comprising:
    a. acquiring metrology data for semiconductor wafers at the conclusion of a final process step for the manufacturing process;
    b. acquiring data for a plurality of process variables for a first process step performed by the manufacturing tool for manufacturing semiconductor wafers;
    c. creating a first mathematical model of the first process step performed by the manufacturing tool based on the metrology data and the acquired data for the plurality of process variables for the first process step performed by the manufacturing tool;
    d. repeating step b. and step c. for at least a second process step performed by the manufacturing tool for manufacturing the semiconductor wafers;
    e. creating an $n^{th}$ mathematical model based on the metrology data and the data for the plurality of process variables for each of the n process steps;
    f. creating a top-level mathematical model based on the metrology data and the models created by steps c., d. and e.;
    g. calculating a multivariate metric based on the top-level model of step f. and data for the plurality of process variables for at least one of the process steps performed by the manufacturing tool during subsequent runs of the manufacturing tool; and
    h. servicing the manufacturing tool if the calculated multivariate metric satisfies a predetermined condition.

2. The method of claim 1, wherein the mathematical models of the process steps are partial least squares models.

3. The method of claim 2, wherein creating the top-level model comprises combining scores for the partial least squares models of the n process steps and the mathematical model of the metrology data.

4. The method of claim 1, wherein the metrology data comprises yield measurements from semiconductor wafers produced by one or more manufacturing runs.

5. The method of claim 1, wherein the multivariate metric is Hotelling's $T^2$ statistic or a DModX statistic.

6. The method of claim 1, wherein the top-level mathematical model comprises process variables that affect yield of the manufacturing process.

7. The method of claim 1, wherein the process variables that have a substantial effect on the metrology data are weighted more in creating the top-level mathematical model than process variables that do not have a substantial effect on the metrology data.

8. A method for monitoring a manufacturing tool, comprising:
  a. acquiring metrology data for semiconductor wafers at the conclusion of a final process step performed by the manufacturing tool;
  b. acquiring data for a plurality of process variables for a first process step performed by the manufacturing tool for manufacturing semiconductor wafers;
  c. creating a first mathematical model of the first process step based on the metrology data and the acquired data for the plurality of process variables for the first process step;
  d. repeating step b. and step c. for at least a second process step performed by the manufacturing tool for manufacturing the semiconductor wafers;
  e. creating an $n^{th}$ mathematical model based on the metrology data and the data for the plurality of process variables for each of the n process steps;
  f. creating a top-level mathematical model based on the metrology data and the models created by steps c., d. and e.;
  g. calculating a multivariate metric based on the top-level model of step f. and data for the plurality of process variables for at least one of the process steps performed by the manufacturing tool during subsequent runs of the manufacturing tool; and
  h. servicing the manufacturing tool if the calculated multivariate metric satisfies a predetermined condition.

9. The method of claim 8, wherein the mathematical models of the process steps are partial least squares models.

10. The method of claim 9, wherein creating the top-level model comprises combining scores for the partial least squares models of the n process steps and the mathematical model of the metrology data.

11. The method of claim 8, wherein the metrology data comprises yield measurements from semiconductor wafers produced by one or more runs of the manufacturing tool.

12. The method of claim 8, wherein the multivariate metric is Hotelling's $T^2$ statistic or the DModX statistic.

13. The method of claim 8, wherein the top-level mathematical model comprises process variables that affect yield of the process steps performed by the manufacturing tool.

14. The method of claim 8, wherein the process variables that have a substantial effect on the metrology data are weighted more in creating the top-level mathematical model than process variables that do not have a substantial effect on the metrology data.

15. A system for monitoring a manufacturing tool used in a manufacturing process, the system comprising:
  a. means for acquiring metrology data for semiconductor wafers at the conclusion of a final process step for a manufacturing process;
  b. means for acquiring data for a plurality of process variables for a first process step performed by the manufacturing tool for manufacturing semiconductor wafers;
  c. a model generation module for creating a first mathematical model of the first process step performed by the manufacturing tool based on the metrology data and the acquired data for the plurality of process variables for the first process step performed by the manufacturing tool;
  d. means for acquiring data for a plurality of process variables for at least a second process step for manufacturing the semiconductor wafers and a model generation module for creating a second mathematical model of the second process step based on the metrology data and the acquired data for the plurality of process variables for the second process step;
  e. a model generation module for creating an $n^{th}$ mathematical model based on the metrology data and the data for the plurality of process variables for each of the n process steps;
  f. a model generation module for creating a top-level mathematical model based on the metrology data and the models created by elements c., d. and e.; and
  g. an analysis module for calculating a multivariate metric based on the top-level model created by element f. and data for the plurality of process variables for at least one of the process steps performed by the manufacturing tool during subsequent runs of the manufacturing tool.

16. The system of claim 15, wherein the mathematical models of the process steps are partial least squares models.

17. The system of claim 16, wherein creating the top-level model comprises combining scores for the partial least squares models of the n process steps and the mathematical model of the metrology data.

18. The system of claim 15, wherein the metrology data comprises yield measurements from semiconductor wafers produced by one or more runs of the manufacturing tool.

19. The system of claim 15, wherein the multivariate metric is Hotelling's $T^2$ statistic or the DModX statistic.

20. The system of claim 15, wherein the top-level mathematical model comprises process variables that affect yield of the process steps performed by the manufacturing tool.

21. The system of claim 15, wherein the process variables that have a substantial effect on the metrology data are weighted more in creating the top-level mathematical model than process variables that do not have a substantial effect on the metrology data.

* * * * *